(12) United States Patent
Teramoto et al.

(10) Patent No.: US 8,564,254 B2
(45) Date of Patent: Oct. 22, 2013

(54) POWER GENERATION AMOUNT CONTROL APPARATUS

(75) Inventors: Toshiyo Teramoto, Okazaki (JP); Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 512 days.

(21) Appl. No.: 12/974,375

(22) Filed: Dec. 21, 2010

(65) Prior Publication Data
US 2011/0148367 A1   Jun. 23, 2011

(30) Foreign Application Priority Data
Dec. 21, 2009 (JP) ................. 2009-288570

(51) Int. Cl.
   *H02P 9/00* (2006.01)
(52) U.S. Cl.
   USPC ............................. 322/28; 322/37
(58) Field of Classification Search
   USPC ................... 322/22, 28, 29, 37, 59
   See application file for complete search history.

(56) References Cited

U.S. PATENT DOCUMENTS

| | | | | |
|---|---|---|---|---|
| 7,253,591 B2* | 8/2007 | Takahashi | | 322/59 |
| 7,294,991 B2* | 11/2007 | Kimura et al. | | 322/37 |
| 7,528,585 B2* | 5/2009 | Maehara | | 322/59 |
| 8,138,730 B2* | 3/2012 | Tsuzuki | | 322/44 |
| 2004/0145186 A1 | 7/2004 | Inokuchi et al. | | |
| 2007/0227499 A1* | 10/2007 | Asada et al. | | 123/339.18 |
| 2007/0247119 A1 | 10/2007 | Maehara | | |
| 2008/0036423 A1* | 2/2008 | Asada | | 320/134 |
| 2008/0246285 A1* | 10/2008 | Asada | | 290/40 C |

FOREIGN PATENT DOCUMENTS

| | | |
|---|---|---|
| JP | H02-204650 | 8/1990 |
| JP | 2004-254491 | 9/2004 |
| JP | 2007-282328 | 10/2007 |
| JP | 2007-295659 | 11/2007 |

OTHER PUBLICATIONS

Japanese Office Action dated Oct. 11, 2011, issued in corresponding Japanese Application No. 2009-288570 with English Translation.

* cited by examiner

*Primary Examiner* — Nicholas Ponomarenko
(74) *Attorney, Agent, or Firm* — Nixon & Vanderhye PC

(57) ABSTRACT

The power generation amount control apparatus includes a battery state determination section, a generator performance determination section, a power-generation-amount increase determination section, an idle state determination section, and a power generation restriction control section. The power generation restriction control section is configured to perform power generation restriction control to restrict a power generation amount of a vehicle generator driven by a vehicle engine when the idle state determination section determines that the vehicle engine is in the idle state, the power-generation-amount increase determination section determines that the power-generation-amount increase demand is not present, and the battery state determination section determines that the battery charged by the vehicle generator is not deteriorated.

9 Claims, 7 Drawing Sheets

US 8,564,254 B2

POWER GENERATION AMOUNT CONTROL APPARATUS

This application claims priority to Japanese Patent Application No. 2009-288570 filed on Dec. 21, 2009, the entire contents of which are hereby incorporated by reference.

BACKGROUND OF THE INVENTION

1. Field of the Invention

The present invention relates to a power generation amount control apparatus for use in a vehicle.

2. Description of Related Art

There is known a power generation control system which operates to stabilize the idle speed of a vehicle engine, and is configured not to perform power generation restriction control when a demand to increase power generation amount is received while the engine is in the idle state in order to prevent the output voltage of a vehicle generator driven by the vehicle engine from falling excessively, and improve response at the time when an electrical load is applied. For example, refer to Japanese Patent Application Laid-Open No. 2007-282328.

Also, there is known a power generation control system configured to restrict an excitation current of a vehicle generator driven by a vehicle engine when the rotational speed of the vehicle generator lowers while the vehicle engine is in the idle state depending on the degree of the lowering of the rotational speed in order to improve the rotation stability and the output voltage of the vehicle generator, and release the restriction of the excitation current when the rotational speed of the vehicle generator has recovered. For example, refer to Japanese Patent Application Laid-Open No. 2007-295659.

However, the conventional techniques described in the above patent documents have a problem in that the output voltage of the vehicle generator may vary and the voltage of a battery charged by the vehicle generator may increase when the power generation restriction control is performed, because the power generation control is not performed taking into account deterioration of the battery or the vehicle generator. For example, when the battery has been deteriorated and the internal resistance thereof has increased excessively, the battery voltage drops extremely when the power generation restriction control is performed, because the battery is in the insufficiently charged state even if the battery has been charged. Further, since the generator torque to generate a certain output current when the vehicle generator is deteriorated is increased compared to that when the vehicle generator is not deteriorated, there may occur a case in which the idle speed cannot be stabilized even when the power generation restriction control is performed, because the power generation restriction control is performed without taking into account this increase of the generator torque, and accordingly reduction of the generator torque by the power generation restriction control may be insufficient to prevent engine speed variation (hunting) from occurring.

As explained above, it is difficult to ensure the idle speed stability and output voltage stability by the conventional power generation control in which deterioration of the battery and the generator are not taken into account.

SUMMARY OF THE INVENTION

The present invention provides a power generation amount control apparatus comprising:
a battery state determination section mounted on terminals or a body of a battery charged by a vehicle generator driven by a vehicle engine mounted on a vehicle to determine whether or not the battery is deteriorated;
a generator performance determination section to determine whether or not performance of the vehicle generator is deteriorated;
a power-generation-amount increase determination section to determine whether or not a power-generation-amount increase demand is present;
an idle state determination section to determine whether or not the vehicle engine is in an idle state; and
a power generation restriction control section to perform power generation restriction control to restrict a power generation amount of the vehicle generator;
wherein the power generation restriction control section is configured to perform the power generation restriction control when the idle state determination section determines that the vehicle engine is in the idle state, the power-generation-amount increase determination section determines that the power-generation-amount increase demand is not present, and the battery state determination section determines that the battery is not deteriorated.

According to the present invention, there is provided a power generation amount control apparatus capable of ensuring idle speed stability of a vehicle engine, output voltage stability of a vehicle generator, preventing excessive voltage drop when an electrical load is applied to the vehicle generator, and improving response of the vehicle generator even when a battery charged by the vehicle generator or the vehicle generator is deteriorated.

Other advantages and features of the invention will become apparent from the following description including the drawings and claims.

PREFERRED EMBODIMENTS OF THE INVENTION

Figure 1:
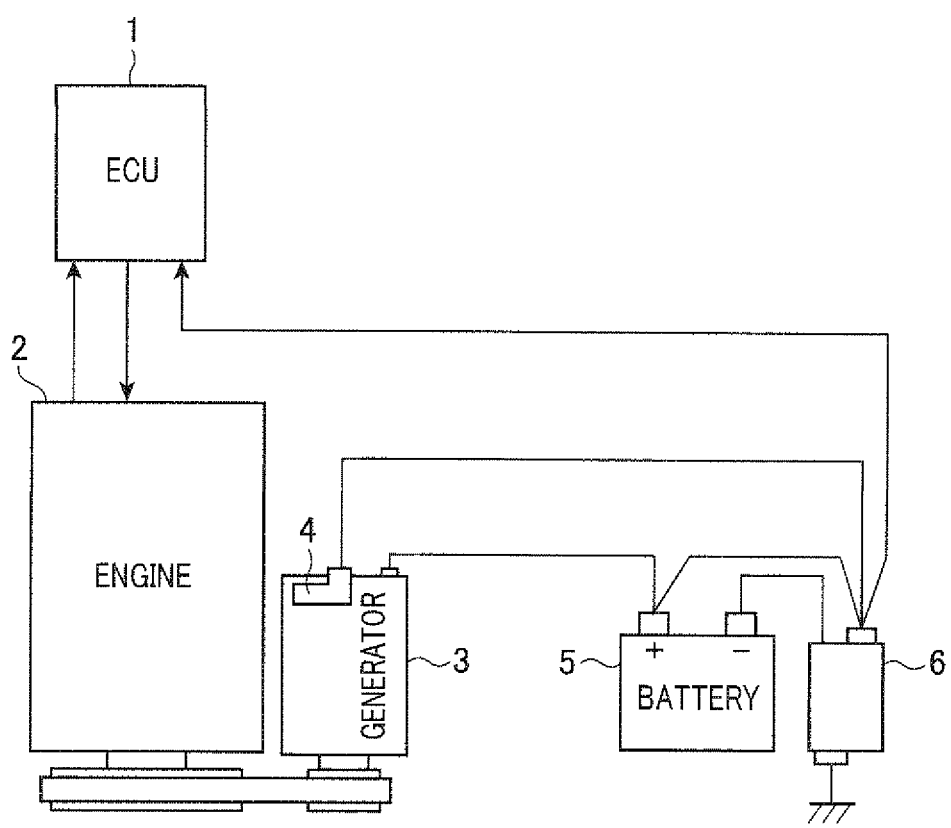
FIG. 1 is a diagram showing the overall structure of a vehicle power generation system including a power generation amount control apparatus according to an embodiment of the invention.

FIG. 1 is a diagram showing the overall structure of a vehicle power generation system including a power generation amount control apparatus according to an embodiment of the invention. The vehicle power generation system includes an ECU 1, a vehicle engine 2, a vehicle generator 3, a battery 5 and the power generation amount control apparatus 6.

The ECU 1 is an electronic control unit which operates as an external control device for controlling the output of the engine 2. The generator 3 is driven by the engine 2 through a belt to generate power used to charge the battery 5 and to operate various electrical loads. The generator 3 includes therein a power generation control device 4 which operates as a voltage regulator to control the output voltage by adjusting an excitation current. The power generation amount control apparatus 6 is disposed in the vicinity of the battery 5 in a state of being in contact with the negative terminal or body of the battery 3, and operates to detect the states of the battery 5 and the generator 3.

Figure 2:
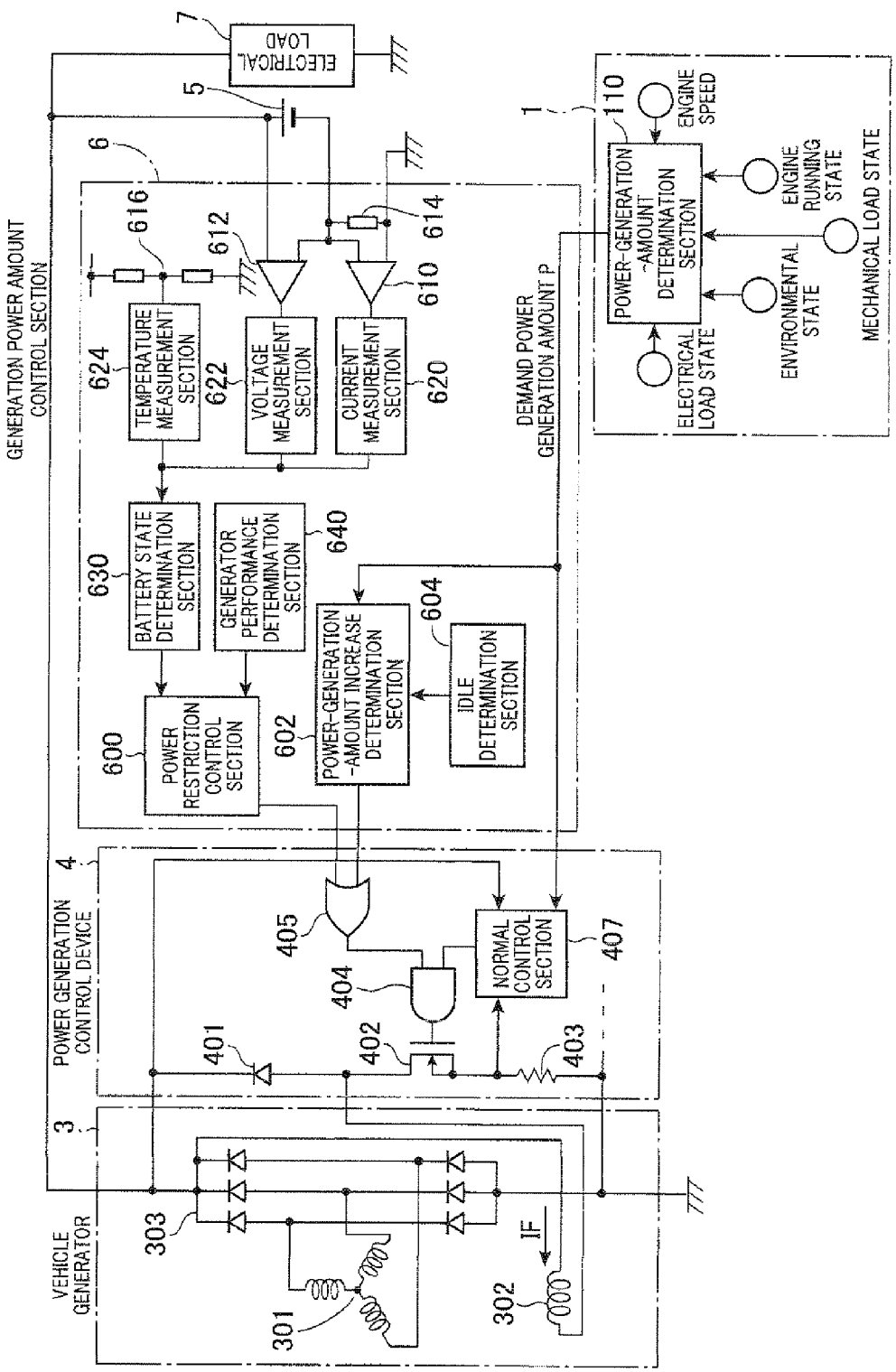
FIG. 2 is a block diagram showing the detailed structure of the vehicle power generation system shown in FIG. 1.

FIG. 2 is a block diagram showing the detailed structure of the vehicle power generation system shown in FIG. 1. The generator 3 is mainly constituted of a stator around which a three-phase stator winding 301 is wound, a rotor around which an excitation winding 302 is wound, and a rectifier circuit 303 for full-wave rectifying the three-phase output of the stator winding 301. The output voltage of the generator 3 is regulated by the power generation control device 4 which on/off-controls the excitation current flowing through the excitation winding 302. The generator 3 includes an output terminal connected to the battery 5 and an electrical load 7, through which a charging current and an operating current are respectively supplied to them.

The power generation control device 4 includes a flywheel diode 401, a switching element 402, a sense resistor 403, an AND circuit 404, an OR circuit 405 and a normal control section 407. The switching element 402 is series-connected to the excitation winding 302 of the generator 3 so that the excitation current is supplied to the excitation winding 302 when the switching element 402 is on. The flywheel diode 402 is parallel-connected to the excitation winding 302 so that an inductor current of the excitation winding 302 generated when the switching element 402 is turned off can pass through the flywheel diode 402. The sense resistor 403 is series-connected to the switching element 402 for measuring the current flowing through the source-drain path of a power MOSFET constituting the switching element 402. The normal control section 407 on/off-controls the switching element 402 to regulate the output voltage of the generator 3 at a predetermined regulation voltage.

Figure 3:
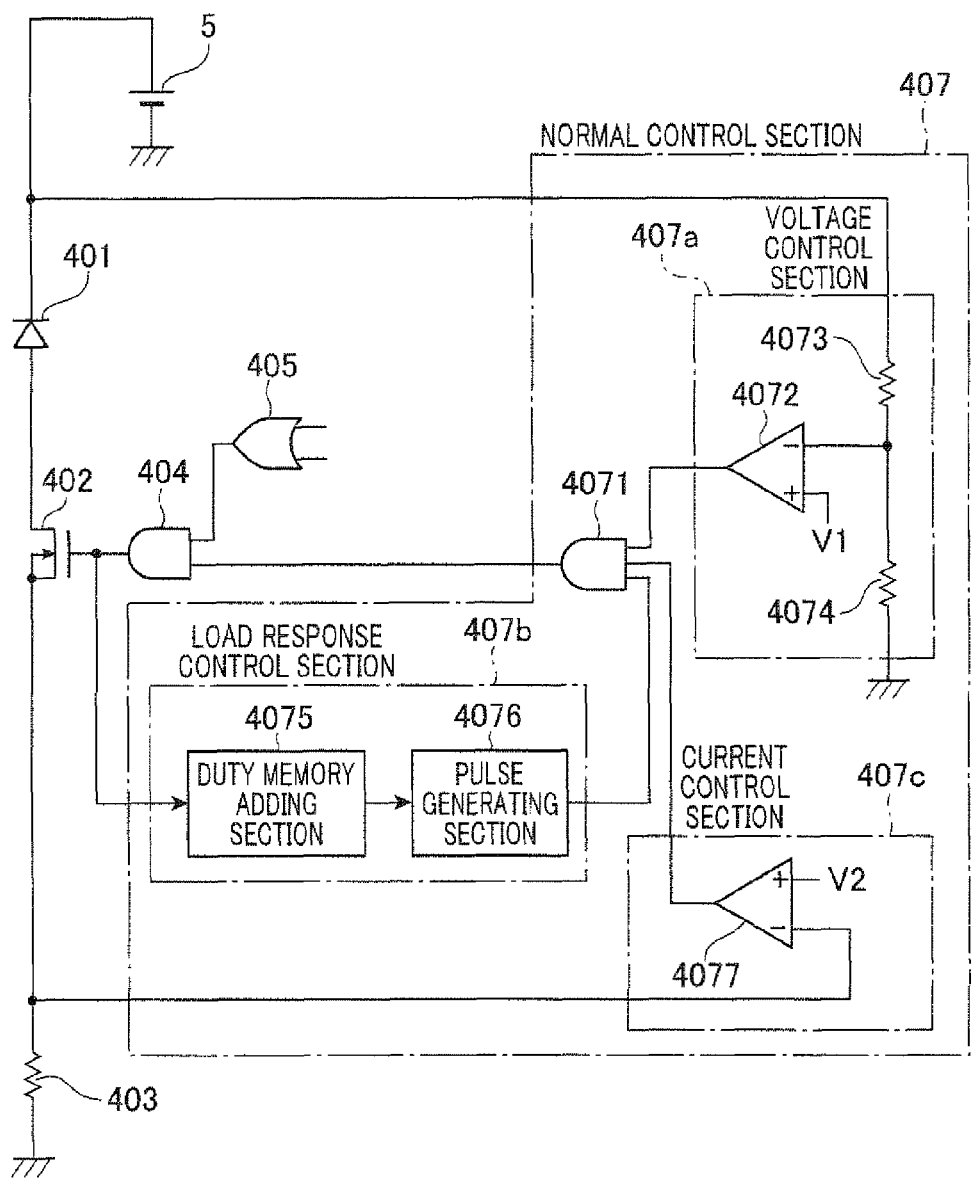
FIG. 3 is a block diagram showing the structure of a normal control section of a power generation control device included in the vehicle power generation system shown in FIG. 1.

FIG. 3 is a block diagram showing the structure of the normal control section 407. As shown in FIG. 3, the normal control section 407 includes a voltage control section 407a, a load response control section 407b, a current control section 407c and an AND circuit 4071. The voltage control section 407a, which is for controlling the output voltage of the generator 3 at the regulation voltage, is constituted of a voltage comparator 4072, and resistors 4073 and 4074. The resistors 4073 and 4074 constitute a voltage divider circuit for dividing the output voltage of the generator 3 with a division ratio determined by the resistances of the resistors 4073 and 4074. The voltage comparator 4072 is applied with the voltage outputted from the voltage divider circuit constituted of the resistors 4073 and 4074 at the negative input terminal thereof, and applied with a reference voltage of V1 corresponding to the regulation voltage at the positive input terminal thereof. The voltage comparator 4072 outputs a low-level signal when the output voltage of the generator 3 is higher or equal to the regulation voltage, and outputs a high-level signal when the output voltage of the generator 3 is lower than the regulation voltage.

The load response control section 407b is constituted of a duty memory adding section 4075 and a pulse generating circuit 407. The load response control section 407b performs gradual excitation control to gradually increase the duty ratio of a drive signal of the switching element 402 (a drive signal applied to the gate of the switching element 402) when the electrical load 7 applied to the generator 3 increases rapidly. The duty memory adding section 4075 memorizes the duty ratio of the drive signal of the switching element 402, and outputs a value equal to the memorized duty ratio added by a predetermined incremental value to the pulse generating section 4076. The pulse generating section 4076 outputs a pulse signal having a duty ratio corresponding to the value received from the duty memory adding section 4075. Accordingly, the pulse signal outputted from the pulse generating section 4076 has a duty ratio larger than the duty ratio of the drive signal of the switching element 402 by the predetermined incremental value.

The current control section 407c, which is for controlling the excitation current below a predetermined value, is constituted of a voltage comparator 4077. The voltage comparator 4077 is applied with a voltage appearing at one end of the sense resistor 403 at the negative input terminal thereof, and a reference voltage V2 corresponding to an upper limit of the excitation current at the positive input terminal thereof. The voltage comparator 4077 outputs a high-level signal when the excitation current exceeds the upper limit, and outputs a low-level signal when the excitation current is lower than or equals to the upper limit.

The power generation amount control apparatus 6 includes a power-generation-amount restriction control section 600, a power-generation-amount increase determination section 602, an idle determination section 604, differential amplifiers 610 and 612, a shunt resistor 614, a temperature detection section 616, a current measurement section 620, a voltage measurement section 622, a temperature measurement section 624, a battery state determination section, and a generator performance determination section 640.

The power-generation-amount restriction control section 600 performs control to restrict the power generation amount of the generator 3. The power-generation-amount increase determination section 602 determines whether a power-generation-amount increase demand is present or not based on a demand power generation amount P received from the ECU 1. The idle determination section 604 determines whether or not the engine 2 is in the idle state.

The differential amplifier 610 amplifies the voltage across the shunt resistor 614 series-connected to an electrical wire which connects the negative terminal of the battery 5 to the ground. The current measurement section 620 measures the current flowing through the shunt resistor 614 based on the output voltage of the differential amplifier 610. The differential amplifier 612 performs level conversion of the battery voltage (the voltage across the positive and negative terminals of the battery 5). The voltage measurement section 622 measures the battery voltage based on the output voltage of the differential amplifier 612. The temperature detection section 616 is constituted of a resistor and a thermistor forming a voltage divider circuit, the voltage across which varies depending on the temperature thereof. The temperature measurement section 624 measures the temperature of the power generation amount control apparatus 6 (the temperature of the battery 5) based on the output voltage (divided voltage) of the temperature detection section 616. The battery state determination section 630 determines presence of deterioration of the battery 5 based on the output values of the current measurement section 620, voltage measurement section 622 and temperature measurement section 624. The generator performance determination section 640 determines presence of performance deterioration of the generator 3.

The ECU 11 includes a power-generation-amount determination section 110. The power-generation-amount determination section 110 always monitors the vehicle state, determines the demand power generation amount P based on the monitored vehicle state, and outputs it to the power-generation-amount increase determination section 602 of the power generation amount control apparatus 6. The vehicle state to be monitored includes the electrical load state, engine rotational speed, engine running state, mechanical load state and environmental state.

Figure 4:
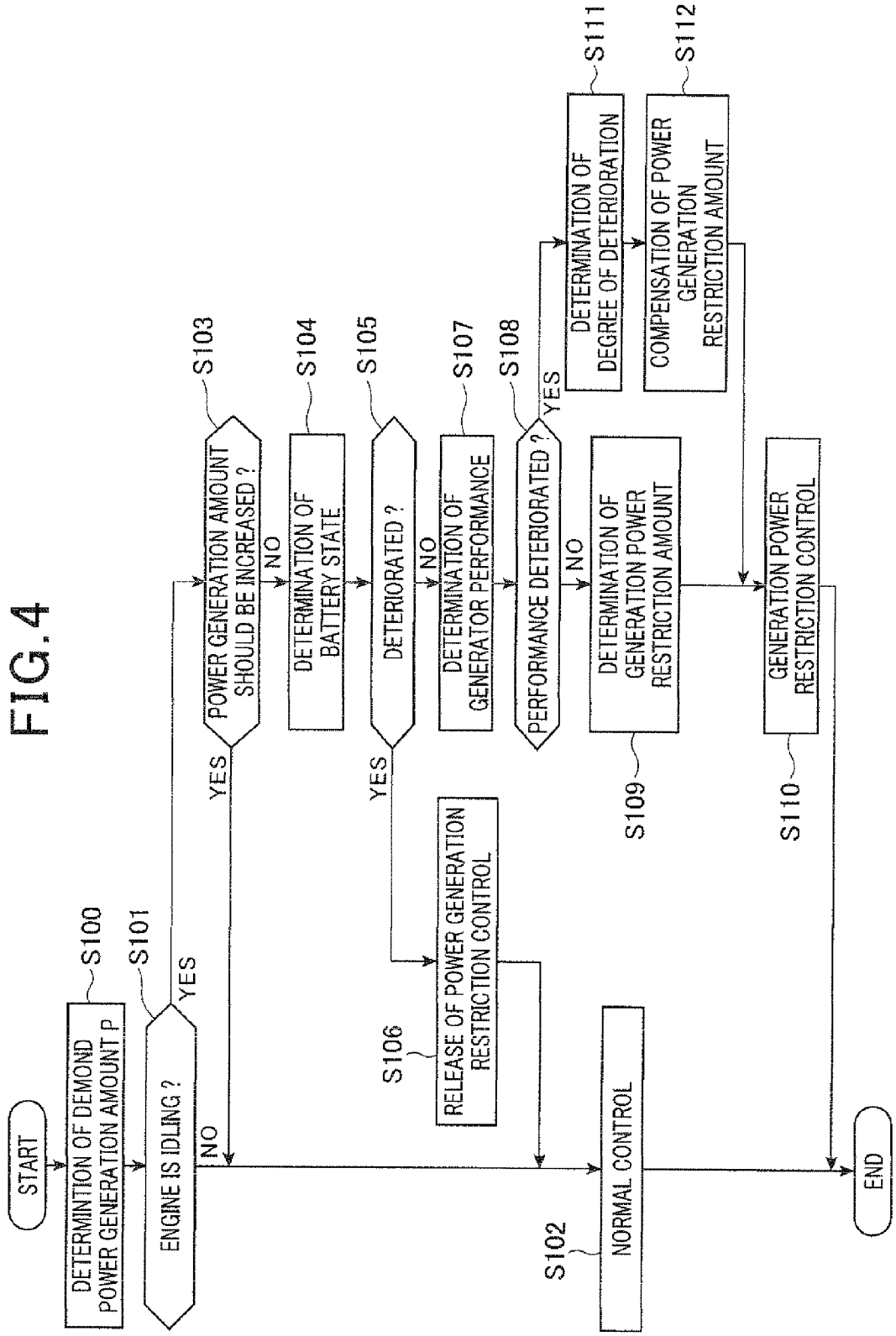
FIG. 4 is a flowchart showing the basic operation of the vehicle power generation system shown in FIG. 1.

Next, the operation of the vehicle power generation system having the structure described above is explained. FIG. 4 is a flowchart showing the basic operation of the vehicle power generation system of this embodiment, which is performed at regular time intervals.

The power-generation-amount determination section 110 monitors the vehicle state including electrical load state, engine rotational speed, engine running state, mechanical load state and environmental state, and determines the demand power generation amount P based on the monitored vehicle state (step S100).

The idle determination section 604 of the power generation amount control apparatus 6 determines whether or not the engine 2 is in the idle state (step S101). If the determination result in step S101 is negative, the normal control section 407 performs normal power generation control to satisfy the demand power generation amount P (step S102). Incidentally, when the idle determination section 604 determines that the engine 2 is not in the idle state, the power-generation-amount increase determination section 602 outputs a high-level signal regardless of the demand power generation amount P. This high-level signal is applied to one input terminal of the AND circuit 404 through the OR circuit 405 of the power generation control device 4. Since the output signal of the normal control section 407 is applied to the other input terminal of the AND circuit 404, the output signal of the normal control section 407 is applied to the switching element 402 as the drive signal through the AND circuit 404, so that the power generation control is performed by the normal control section 407. More specifically, the control section 407 variably sets the reference voltages V1 and V2 to increase or decrease the power generation amount in accordance with the demand power generation amount P.

On the other hand, if the determination result in step S101 is affirmative, the power-generation-amount increase determination section 602 determines whether or not the power-generation-amount increase demand is present (step S103). More specifically, the power-generation-amount increase determination section 602 calculates a difference between the current demand power generation amount $P_n$ and the previous demand power generation amount $P_{n-1}$, and determines that the power-generation-amount increase demand is present if the calculated difference exceeds a predetermined value. If the determination result in step S103 is affirmative, the power-generation-amount increase determination section 602 outputs a high-level signal so that the normal control section 407 performs the normal power generation control (step S102).

If the determination result in step S103 is negative, since the power-generation-amount increase determination section 602 outputs a low-level signal, and this low-level signal is applied to one input terminal of the OR circuit 405, the control by the power-generation-amount restriction control section 600 becomes effective.

Thereafter, the battery state determination section 630 checks the state of the battery 5 (step S104), and determines whether or not the battery 5 is deteriorated (step S105). For example, it is possible to determine whether or not the battery 5 is deteriorated by estimating the internal resistance of the battery 5 from the battery current and the battery voltage taking into account of the battery temperature. Incidentally, determination of the battery state does not necessary have to be performed each time the basic operation is performed. It may be performed when a large electrical load is applied, and a large current flows from the battery 5 temporarily. If the determination result in step S105 is affirmative, the power-generation-amount restriction control section 600 releases the power generation restriction control (step S106). In this case, the power-generation-amount restriction control section 600 outputs a high-level signal, and this high-level signal is applied to the other input terminal of the OR circuit 405, so that the normal control section 407 performs the normal power generation control (step S102).

On the other hand, if the determination result in step S105 is negative, the generator performance determination section 640 checks performance of the generator 3 (step S107), and determines whether or not the performance of the generator 3 is deteriorated (step S108). If the determination result in step S108 is negative, the power-generation-amount restriction control section 600 determines a power generation restriction amount (step S109), and performs the power generation restriction control (step S110).

The power-generation-amount restriction control section 600 has the structure which is basically the same as that of the normal control section 407. Each of the reference voltages V1 and V2 respectively generated in the voltage control section 407a and the current control section 407c is set lower depending on the power generation restriction amount. The power-generation-amount restriction control section 600 does not need to perform the gradual excitation control, and accordingly the duty ratio of the pulse signal outputted from the pulse generating section 4076 is set to a low value when the power generation restriction control is performed.

If the determination result in step S108 is affirmative, the generator performance determination section 640 determines the degree of performance deterioration (step S111). The power-generation-amount restriction control section 600 compensates the power generation restriction amount depending on the degree of performance deterioration as explained in detail later (step S112), and performs the power generation restriction control (step S110).

Figure 5:
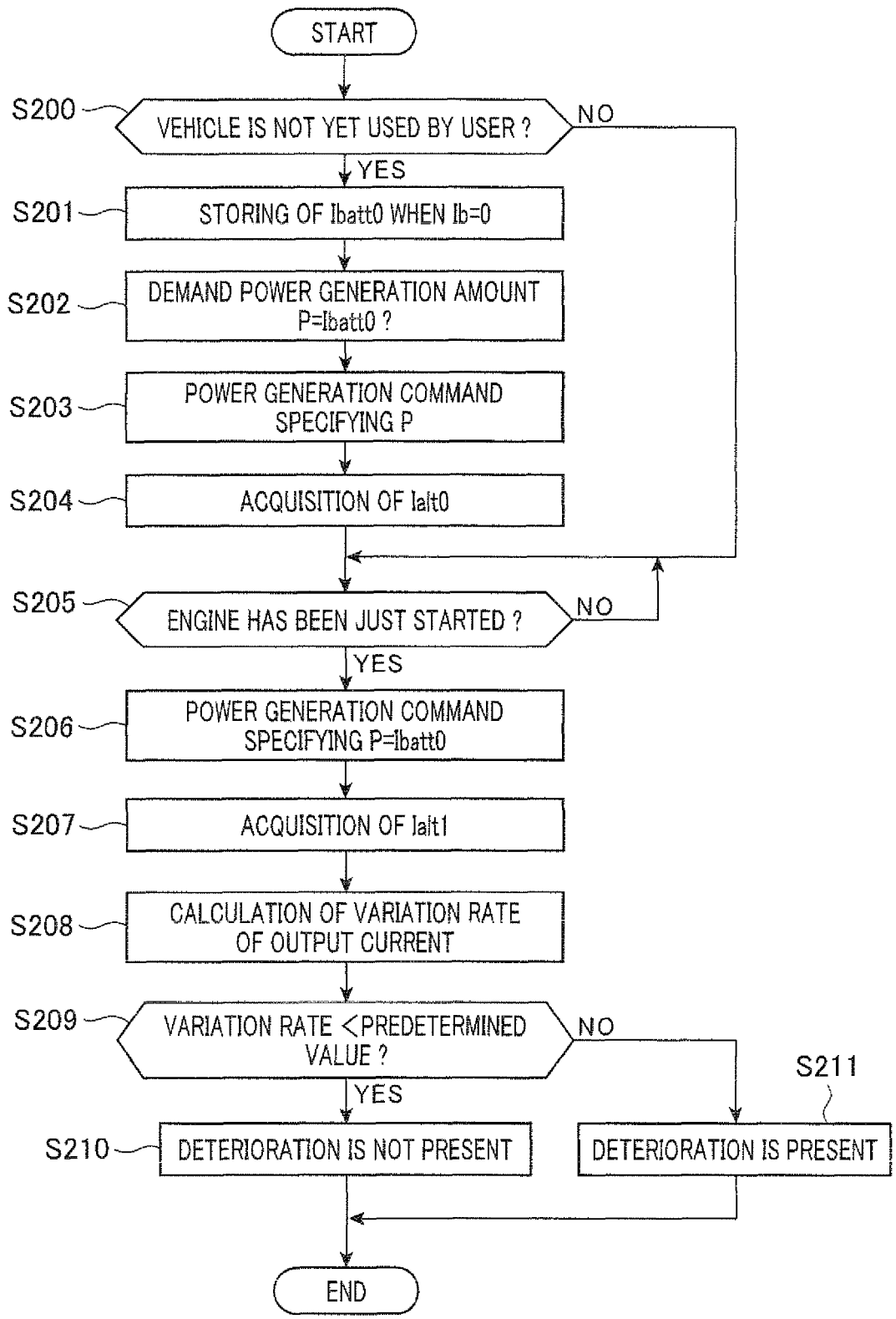
FIG. 5 is a flowchart showing a process to determine performance deterioration of a vehicle generator performed by the power generation amount control apparatus shown in FIG. 1.

FIG. 5 is a flowchart showing the operation of determining performance deterioration of the generator 3 corresponding to the operations in steps S108 and S111 shown in FIG. 4. As shown in FIG. 5, the generator performance determination section 640 determines whether the ignition switch of the vehicle is turned on before the vehicle is used by a user, for example, before delivery of the vehicle to the user (step S200). If the determination result in step S200 is affirmative, the generator performance determination section 640 stores the battery current Ibatt0 flowing from the battery 5 when a predetermined electrical load is applied under condition of the output current Ib of the generator 3 being 0 before start of the engine 2 (step S201). After the engine 2 is started, the generator performance determination section 640 set the battery current Ibatt0 as the demand power generation amount P (step S202), and transmits a power generation command specifying this demand power generation amount P to the generator 3 (step S203). This demand power generation amount P is sent to the normal control section 407 of the power generation control device 4 as well as the demand power generation amount P outputted from the power-generation-amount determination section 110. Next, the generator performance determination section 640 acquires the output current of the generator 3 at this time as an output current initial value Ialt0 (step S204). Although a specific structure to acquire the output current of the alternator 3 is omitted from illustration in FIG. 2, the output current of the generator 3 can be detected, for example, in such a way that a voltage across a sense resistor for output detection (not shown) is transmitted from the power generation control device 4 to the generator performance determination section 640 so that the generator performance determination section 640 can determine the output current of the generator 3 based on the received voltage. Alternatively, there may be adopted a method in which a means to detect the temperature of the generator 3 is provided in the power generation control device 4, map data or table data showing a relationship among the temperature, rotational speed, excitation current and output current of the generator 3 is stored in the power generation amount control apparatus 6, and the generator performance determination section 640 determines the output current of the generator 3 based on the detected temperature, rotational speed and excitation current. The rotational speed of the generator 3 can be detected, for example, in such a way that the frequency of the phase voltage is converted into a voltage, this voltage is transmitted to the generator performance determination section 640 so that the generator performance determination section 640 can determine the rotational speed of the generator 3 based on this voltage.

After completion of step S204, or when the ignition switch is turned on after the vehicle is delivered to the user, the generator performance determination section 640 determines whether or not the engine 2 has been just started (step S205). Step S205 is provided for making a determination of performance deterioration of the generator 3 immediately after engine start. If the determination result in step S205 is negative, the system waits until an affirmative determination is made in step S205.

If the determination result in step S205 is affirmative, the generator performance determination section 640 transmits a power generation command specifying the battery current Ibatt0 stored in step S202 as the demand power generation amount P (step S206), and acquires the output current Ialt1 of the generator 3 at this time (step S207).

Subsequently, the generator performance determination section 640 calculates a variation ratio (Ialt0-Ialt1)/Ialt0 of the output current (step S208). This variation ratio indicates the degree of the performance deterioration. The performance deterioration of the generator 3 is smaller when the variation ratio is closer to 0, and is larger when the variation ratio is closer to 1. In step S111, the determination of performance deterioration is made by acquiring this variation rate.

Next, the generator performance determination section 640 determines whether or not the variation ratio is smaller than a predetermined value (step S209). If the determination result in step S209 is affirmative, the generator performance determination section 640 determines that the performance of the alternator 3 is not deteriorated (step S210). If the determination result in step S209 is negative, the generator performance determination section 640 determines that the performance of the alternator 3 is deteriorated (step S211).

Figure 6:
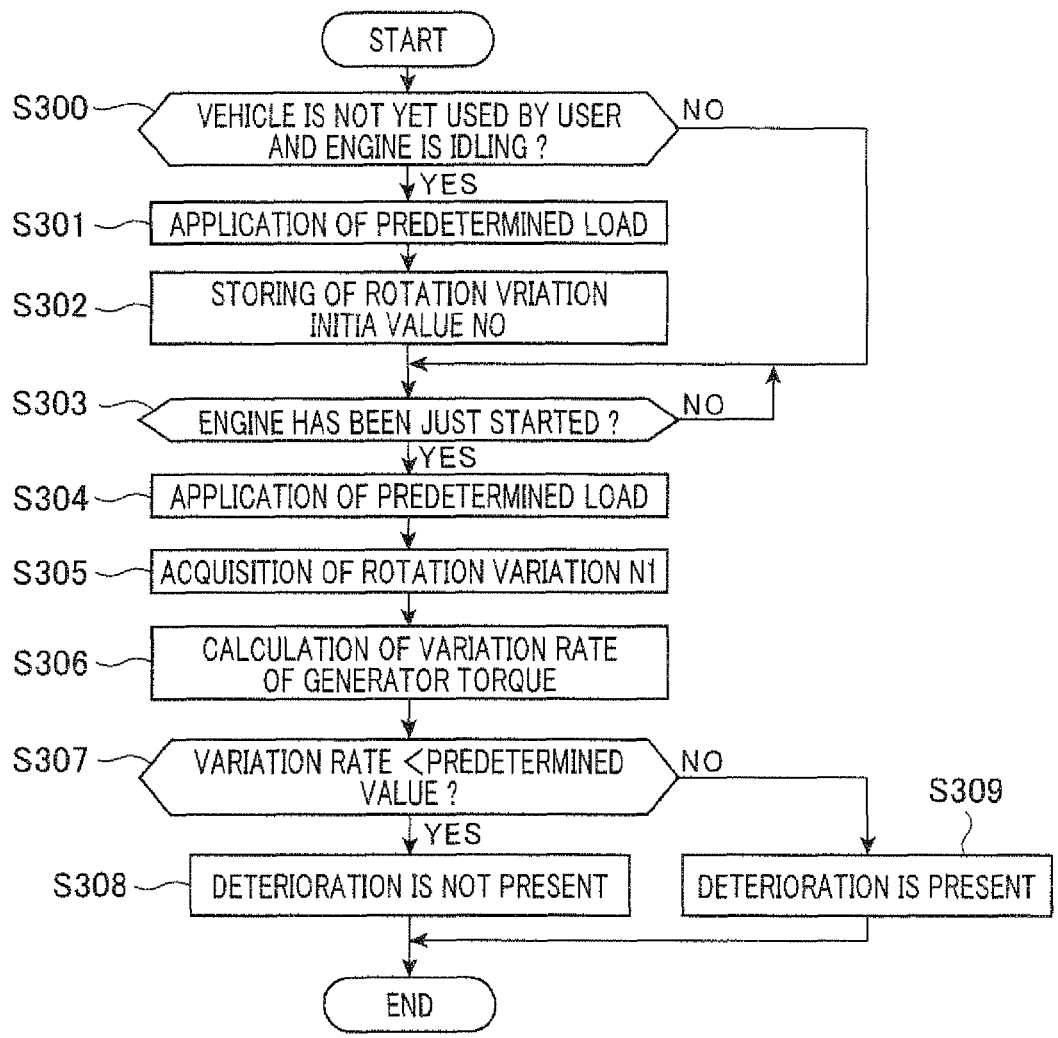
FIG. 6 is a flowchart showing a modification of the process to determine performance deterioration of the vehicle generator.

FIG. 6 is a flowchart showing a modification of the performance deterioration determination operation shown in FIG. 5. To determine performance deterioration of the generator 3, one of the performance deterioration determination operations shown in FIG. 5 and FIG. 6 is used, however, these operations may be used together.

Figure 7:
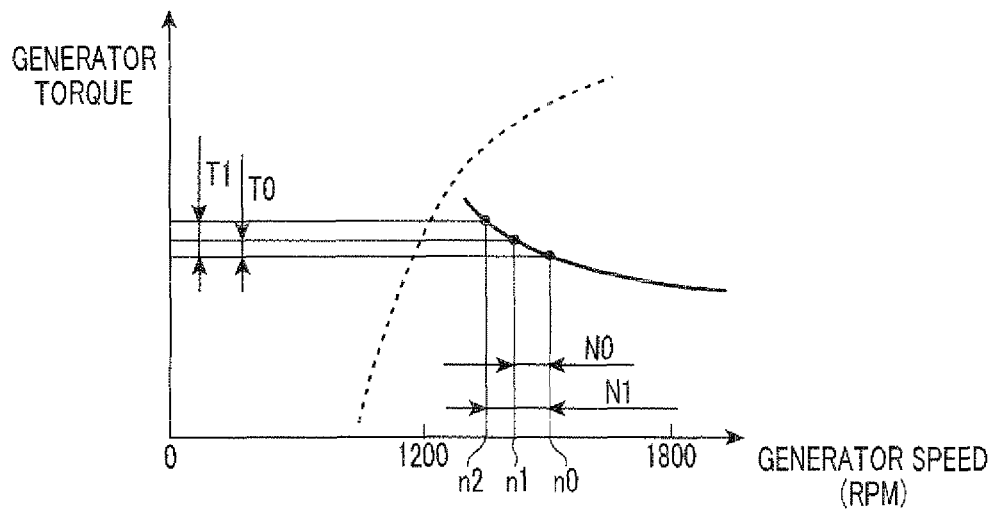
FIG. 7 is a diagram showing a relationship among performance deterioration, rotational speed variation and torque variation of a vehicle generator included in the vehicle power generation system shown in FIG. 1.

FIG. 7 is a diagram showing the relationship among performance deterioration, rotation variation and torque variation of the generator 3. In FIG. 7, it is assumed that the rotational speed falls from n0 to n1 when an electrical load of 50 A is step-applied to the generator 3 whose performance is not deteriorated. In this assumption, if the performance of the generator 3 is deteriorated, the rotational speed falls from n0 to n2 which is lower than n1 when the same electrical load of 50 A is step-applied. This is because the generator torque when the generator 3 is deteriorated is larger that when the generator 3 is not deteriorated. In this embodiment, the relationship shown in FIG. 7 is known, for example, through actual measurements. Accordingly, it is possible to estimate variation of the generator torque and to determine the degree of performance deterioration of the generator 3 from rotation variation of the generator 3. The generator torque characteristic shown in FIG. 7 is stored as map data as a function of the temperature for each generator type. The generator performance determination section 640 performs an operation to determine performance deterioration using the map data as described below. The map data may be stored in the generator performance determination section 640, or stored in a storage section provided separately.

At the beginning of this operation, the generator performance determination section 640 determines whether or not the vehicle has not been used by the user, for example, has not been delivered yet to the user, and the engine is in the idle state (step S300). If the determination result in step S300 is affirmative, the generator performance determination section 640 applies the electrical load 7 to the generator 3 (step S301), and stores rotation variation of the generator 3 at this time as an initial rotation variation N0 (=n0-n1) (step S302). Although a specific structure to detect the rotational speed of the generator 3 is not shown in FIG. 2, the rotational speed of the generator 3 can be detected, for example, in such a way that the frequency of the phase voltage is converted into a voltage, this voltage is transmitted to the generator performance determination section 640 so that the generator performance determination section 640 can determine the rotational speed of the generator 3 based on this voltage.

After completion of step S302, or when the vehicle is not in the idle state, the generator performance determination section 640 determines whether or not the engine 2 has been just started (step S303). Step S303 is provided for making a determination of performance deterioration of the generator 3 immediately after engine start. If the determination result in step S303 is negative, it is waited until an affirmative determination is made in step S303.

If the determination result in step S303 is affirmative, the generator performance determination section 640 applies the electrical load 7 (step S304), and acquires rotation variation N1 at this time (step S305).

Subsequently, the generator performance determination section 640 calculates the variation ratio of the generator 3 from the rotation variation initial value N0 stored in step S302 and the rotation variation N1 acquired in step S305 (step S306). More specifically, the generator performance determination section 640 determines a variation T0 of the generator torque corresponding to the rotation variation initial value N0 and a variation T1 of the generator torque corresponding to the rotation variation N1 based on the generator torque characteristic shown in FIG. 7, and calculates the variation ratio (T1-T0)/T0 of the generator torque. This variation ratio indicates a degree of performance deterioration of the generator 3. The performance deterioration of the generator 3 is smaller when the variation ratio is closer to 0, and is larger when the variation ratio is closer to 1. In step S111, the determination of performance deterioration is made by acquiring this variation rate.

Next, the generator performance determination section 640 determines whether or not the variation ratio is smaller than a predetermined value (step S307). If the determination result in step S307 is affirmative, the generator performance determination section 640 determines that the performance of the generator 3 is not deteriorated (step S308). If the determination result in step 307 is negative, the generator performance determination section 640 determines that the performance of the generator 3 is deteriorated (step S309).

The operation to determine performance deterioration of the generator 3 shown in FIG. 5 or FIG. 6 is performed before or after the vehicle is delivered to the use, and the results (presence of performance deterioration, and the degree of deterioration indicated by the variation rates of the output current and the generator torque) are used in step 108 or step S111.

As described above, according to the power generation amount control apparatus 6, since a determination is made on whether the battery 5 is deteriorated, and the power generation restriction control is not performed when the battery 5 is determined to be deteriorated, it possible to prevent an excessive voltage variation from occurring and to improve response of the system. On the other hand, if the battery is determined to be not deteriorated, the power generation restriction control is performed as necessary to ensure stability of the idle speed of the engine 2. Further, if the generator 3 is determined to be deteriorated since the control to restrict the power generation amount is performed depending on the degree of the deterioration, it is possible to perform the power generation restriction control appropriately depending on the degree of deterioration of the generator 3 to thereby stabilize the rotational speed of the engine 2 in the idle state.

Since when the performance of the generator 3 is deteriorated, the output current-rotational speed characteristic and the output current-generator torque characteristic are changed, it is possible to accurately determine presence and degree of performance deterioration by detecting the variation rate of the output current or the generator torque.

Further, by compensating the power generation restriction amount set for the battery 5 not deteriorated to adapt to the detected deterioration, and performing the control to restrict the power generation amount in accordance with the compensated power generation restriction amount, it is possible to properly perform the power generation restriction control when the battery 5 is deteriorated by a simple process in which the power generation restriction amount for an un-deteriorated battery is compensated. Further, by increasing the amount of power generation restriction as the degree of the detected deterioration increases, variation of the engine idle speed can be suppressed more reliably, because the power generation restriction control is performed taking into account the degree of the detected deterioration. It is also possible to prevent the voltage variation from becoming excessive when the battery is deteriorated by releasing the control to restrict the power generation amount when the battery is determined to be in the deteriorated state.

It is also possible to determine presence and degree of performance deterioration of the generator more reliably by making a comparison between the variation rate of the output current or generator torque when the vehicle is not used by the user (before the vehicle is delivered to the user) with that when the vehicle is used by the user (immediately after the engine is started after the vehicle is delivered to the user). Further, by storing the generator torque characteristic as a function of the temperature in the form of map data for each type of generator, the generator torque can be calculated easily and accurately for each type of generator.

Figure 8:
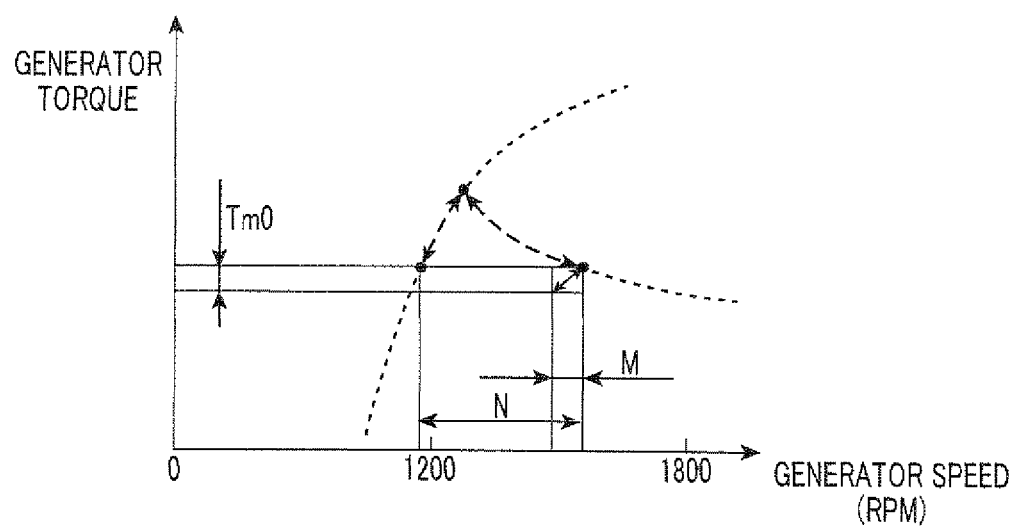
FIG. 8 is a diagram showing effects of power generation restriction control performed in the vehicle power generation system shown in FIG. 1 when the performance of the vehicle generator is not deteriorated.

FIG. 8 is a diagram showing the effect of the power generation restriction control when the performance of the generator 3 is not deteriorated. Here, it is assumed that large hunting shown by N occurs when an electrical load is applied and the generator torque increases to keep the output current at 50 A. If the maximum allowable increase of the generator torque to suppress the hunting as small as shown by M is Tm0, the power generation restriction control is performed to reduce the generator torque (output current) by Tm0 so that the increase of the generator torque is suppressed within Tm0.

Figure 9:
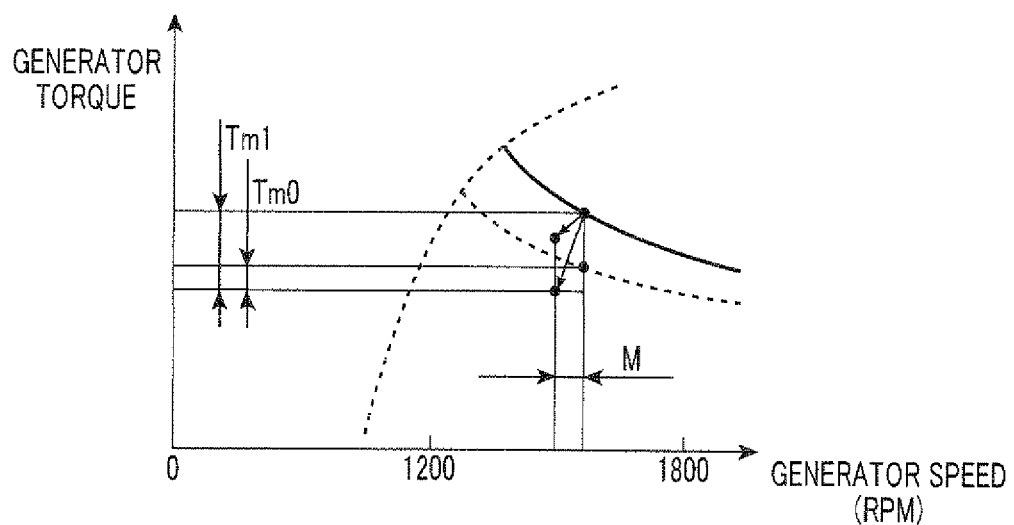
FIG. 9 is a diagram showing effects of the power generation restriction control performed in the vehicle power generation system shown in FIG. 1 when the performance of the vehicle generator is deteriorated.

FIG. 9 is a diagram showing the effect of the power generation restriction control when the performance of the generator 3 is deteriorated. When the performance of the generator 3 is deteriorated, the generator torque to keep the output current at the same value (50 A, for example) increases. Accordingly, even if the power generation restriction control is performed so that the generator torque (output current) is reduced by Tm0 to thereby suppress the increase of the generator torque within Tm0, the hunting does not become as small as shown by M, because the generator torque is still large. Hence, when the performance of the generator 3 is deteriorated, the hunting can be suppressed to a smaller value shown by M by performing the power generation control to reduce the generator torque (the output current) by Tm1 which is larger than Tmo. The value of increase of the generator torque due to performance deterioration of the generator depends on the degree of performance deterioration. Accordingly, in this embodiment, the degree of performance deterioration is detected in step S111, and the amount of power generation restriction is compensated depending on the detected degree of performance deterioration in step S112.

The above explained preferred embodiments are exemplary of the invention of the present application which is described solely by the claims appended below. It should be understood that modifications of the preferred embodiments may be made as would occur to one of skill in the art.

What is claimed is:

1. A power generation amount control apparatus comprising:
   a battery state determination section mounted on terminals or a body of a battery charged by a vehicle generator driven by a vehicle engine mounted on a vehicle to determine whether or not the battery is deteriorated;
   a generator performance determination section to determine whether or not performance of the vehicle generator is deteriorated;
   a power-generation-amount increase determination section to determine whether or not a power-generation-amount increase demand is present;
   an idle state determination section to determine whether or not the vehicle engine is in an idle state; and
   a power generation restriction control section to perform power generation restriction control to restrict a power generation amount of the vehicle generator;

wherein the power generation restriction control section is configured to perform the power generation restriction control when the idle state determination section determines that the vehicle engine is in the idle state, the power-generation-amount increase determination section determines that the power-generation-amount increase demand is not present, and the battery state determination section determines that the battery is not deteriorated.

2. The power generation amount control apparatus according to claim 1, wherein the power generation restriction control section performs the power generation restriction control when the generator performance determination section determines that performance of the vehicle generator is deteriorated in order that the power generation amount of the vehicle generator is reduced depending on a degree of performance deterioration of the vehicle generator.

3. The power generation amount control apparatus according to claim 2, wherein the generator performance determination section determines the degree of performance deterioration of the vehicle generator based on a temporal variation of at least one of an output current of the vehicle generator and a generator torque of the vehicle generator.

4. The power generation amount control apparatus according to claim 3, wherein the power generation restriction control section determines a power generation restriction amount as a target value of the power generation restriction control when the battery is deteriorated by compensating a power generation restriction amount as a target value of the power generation restriction control when the battery is not deteriorated, in accordance with the temporal variation.

5. The power generation amount control apparatus according to claim 2, wherein the power generation restriction control section performs the power generation restriction control such that a power generation restriction amount is set larger when the degree of performance deterioration of the vehicle generator is higher.

6. The power generation amount control apparatus according to claim 1, wherein the power generation restriction control section is configured to release the power generation restriction control when the battery state determination section determines that the battery is deteriorated.

7. The power generation amount control apparatus according to claim 1, wherein the generator performance determination section determines a degree of performance deterioration of the vehicle generator based on a variation ratio of an output current of the vehicle generator when the vehicle generator generates power to satisfy an applied predetermined power generation demand before the vehicle is used by a user, and a variation ratio of the output current of the vehicle generator when the vehicle generator generates power to satisfy the applied predetermined power generation demand after the vehicle is used by the user.

8. The power generation amount control apparatus according to claim 1, wherein the generator performance determination section determines the degree of performance deterioration of the vehicle generator based on a variation ratio of a generator torque when a predetermined electrical load is applied to the vehicle generator before the vehicle is used by a user, and a variation ratio of the generator torque when the predetermined electrical load is applied to the vehicle generator before the vehicle is used by the user.

9. The power generation amount control apparatus according to claim 8, wherein the power generation amount control apparatus stores a rotational speed-generator torque characteristic of the vehicle generator as a function of temperature of the power generation amount control apparatus for each vehicle generator type in the form of map data, and the generator performance determination section calculates the variation ratio of the generator torque using the map data.

* * * * *